United States Patent [19]
Landi et al.

[11] Patent Number: 5,896,537
[45] Date of Patent: Apr. 20, 1999

[54] PARTITION BASED ALIAS ANALYZER FOR POINTERS

[75] Inventors: William A. Landi, Mercerville, N.Y.; Rita Z. Altucher, Kendall Park, N.J.

[73] Assignee: Siemens Corporate Research, Inc., Princeton, N.J.

[21] Appl. No.: 08/645,371

[22] Filed: May 13, 1996

[51] Int. Cl.$^6$ .................................................. G06F 9/44
[52] U.S. Cl. ........................................................ 395/704
[58] Field of Search ..................................... 395/704, 709

[56] References Cited

U.S. PATENT DOCUMENTS

| | | | |
|---|---|---|---|
| 5,161,216 | 11/1992 | Reps et al. | 395/704 |
| 5,448,737 | 9/1995 | Burke et al. | 395/709 |
| 5,485,616 | 1/1996 | Burke et al. | 395/709 |
| 5,535,394 | 7/1996 | Burke et al. | 395/709 |
| 5,644,709 | 7/1997 | Austin | 395/185.06 |

Primary Examiner—Tariq R. Hafiz
Assistant Examiner—John Q. Chavis
Attorney, Agent, or Firm—Donald B. Paschburg

[57] ABSTRACT

An apparatus that provides for the safe and efficient alias analysis for programs written in programming languages which use pointers combines a representation generator with a partitioned based alias analyzer and provides safe alias solutions using partitions to consumers of alias solutions. The source code of the program to be analyzed enters a parser of the representation generator and an abstract syntax tree representation of the syntactic structure of the source program is derived Next, a control flow graph (CFG) builder within the representation generator derives the program's control flow graph for the abstract syntax tree. The control flow graph is then used by the partition based alias analyzer which is divided into three phases; phase one—type one alias effects, phase two—type two alias effects and phase three—function pointer effects, to produce safe alias solutions using partitions.

16 Claims, 3 Drawing Sheets

One embodiment of the invention

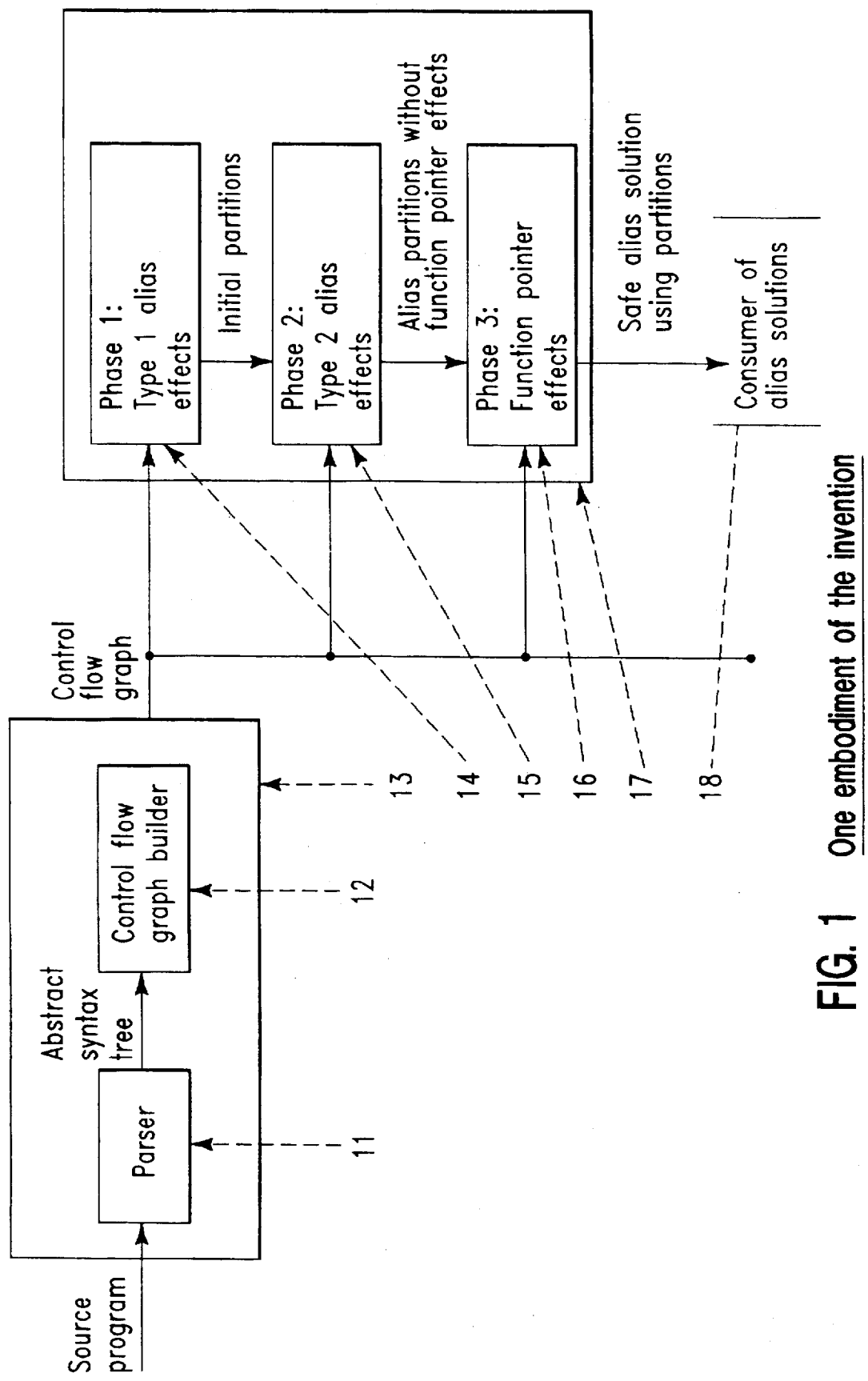
FIG. 1 One embodiment of the invention

Phase 1: Creating Initial Partitions
for each plausible left-hand-side (lhs) right-hand-side (rhs) pair in the
   program union (*lhs ,*rhs )

Phase 2: Refining Partitions for Type 2 Alias effects
for each partition part
   map [part] = λx.NULL (everything maps to NULL)
for each interesting name X which is an operation op applied to a
   name Y[a] if find (X) ≠ find (map[find(Y)][op])[b]
      then
         if map [find(Y)][op] is NULL
            then redefine map [find(Y)][op] to be find (X)
            else merge (find(X),map [find(Y)][op])

Phase 3: Accounting for Calls through Function Pointers
repeat
   for each call through a function pointer which has arguments
      (fp(arg$_1$,...,arg$_n$)) for each function func in the partition of fp
         merge (find(*arg$_i$), find(*form$_i$)) for all 1 < i < n where form$_i$
         is the i$^{th}$ formal of func
until no changes in the partitions involving function pointers.

---

[a] Some examples: X=*p, Y = p, and op = *; X=s.f, Y = s, and op = .f.
[b] The outermost find is needed because a partition is represented by a representative element. Since union can change which element is the representative element, a find is needed here. For simplicity, find (NULL) is NULL.

Apparatus for finding Partition May Aliases

FIG. 2

$$\text{merge}(\text{part}_1, \text{part}_2)$$
$$\text{if find}(\text{part}_1) = \text{find}(\text{part}_2)$$
$$\text{let old}_1 = \text{map}[\text{find}(\text{name}_1)] \text{ and old}_2 = \text{map}[\text{find}(\text{name}_2)]$$
$$\text{union}(\text{part}_1, \text{part}_2)$$

$$\text{map}[\text{find}(\text{name}_1)] = \lambda x. \begin{pmatrix} \text{NULL} & \text{if old}_1[x] = \text{old}_2[x] = \text{NULL} \\ \text{old}_1(x) & \text{if old}_2[x] = \text{NULL} \\ \text{old}_2(x) & \text{if old}_1[x] = \text{NULL} \\ \text{merge}(\text{old}_1[x], \text{old}_2[x]) & \text{otherwise} \end{pmatrix}$$

$$\text{return find}(\text{name}_1)$$

FIG. 3 Merge

| program | lines of code | number of procedures | alias analyzer time |
|---------|---------------|----------------------|---------------------|
| zip     | 7,416         | 109                  | 2.42s               |
| sc      | 8,116         | 153                  | 2.81s               |
| larn    | 9,409         | 261                  | 1.75s               |
| espresso| 13,500        | 307                  | 13.16s              |
| spim    | 13,527        | 168                  | 2.24s               |
| tsl     | 14,646        | 450                  | 22.77s              |
| moria   | 24,527        | 433                  | 15.61s              |
| T-W-MC  | 28,273        | 204                  | 19.51s              |
| nethack | 34,636        | 478                  | 29.48s              |

FIG. 4 Analysis times of several programs

PARTITION BASED ALIAS ANALYZER FOR POINTERS

BACKGROUND OF THE INVENTION

1. Field of the Invention

The present invention relates to alias analyzers and more particularly to safe and efficient alias analyzers for programs written in programming languages that use pointers.

2. Description of the Prior Art

Computer languages require a mechanism to name memory locations. For example, variable declarations associate the variable identifier with a memory location. In most modern computer languages, multiple names can be assigned to the same memory location; such names are called aliases. Languages like C, C++, Fortran 90 and Ada have special variables called pointers. A pointer is a variable which, instead of storing data, stores the addresses of another memory location.

There are two important unary (one-input) operators associated with pointers. The first is the address operator (&) which given a variable yields the memory location of that variable. The second is the dereference operator (*). The meaning of dereferencing variable x (e.g., *x) depends on whether *x is being written (e.g., the left-hand-side of an assignment statement) or read (e.g., the right-hand-side of an assignment). In the former case, *x is the location stored in x, and in the latter case *x yields the value stored in the location stored in x.

For example, consider:

p=&v;
v=5;
*p=5;
z=v;
z=*p;

Symbol Table

| variable | memory location |
|---|---|
| p | 1000 |
| v | 1050 |
| z | 1100 |

The assignment p=&v puts 1050 into location 1000 and the name *p is aliased to v. At this point, the names *p and v both refer to location 1050; thus using *p is identical to using v. Thus, v=5 and *p=5 both store 5 in location 1050, and both z=v and z=*p write 5 (the value stored at location 1050) into location 1100 (named z). Variables are different than names like *p, as a variable names the same location for the entire execution of the program but *p max name different locations at different points during the execution: Often a variable is used as the location which the variable names (e.g., location v is used to mean location 1050).

It is also possible to associate names with locations that do not exist when the program is compiled. This is done through dynamic memory allocation. For example, the C statement p=malloc(sizeof(int)) assigns to p some location to which integers can be written. Throughout this description, C syntax; C and pointers are used which are described in C: *A Reference Manual* by Harbison, S. P. and Steele, G. L. Jr., Prentice Hall, 1984.

The present state of the art in alias analyzers for programs using pointers is a plethora of techniques that work nicely on small programs but can not currently handle realistic size programs. These techniques fall into three general classes: techniques which find an alias solution for each statement, techniques which find an alias solution for each subroutine, and techniques which find one alias solution for the entire program. All of these techniques use pairs of "names" to represent the alias solution. However, in some cases these pairs are alias pairs (e.g., <a,b> represents that a and b are aliased) and in others they are points-to pairs (e.g., <c,d> represents that c points to d and thus *c and d are aliased). In some cases, points-to pairs are expressed as a function that maps a name to the set of names it can point-to. The exact definition of "names" varies from method to method as well as which names are considered by the analyzer. Finally, existing techniques vary significantly in how they account for interprocedural realizable paths. That is, they vary on how they transfer aliases between calling and called subroutines.

The extant techniques of the prior art are summarized in Table 1 below:

| technique | one alias solution per | alias or points-to pairs | published empirical results largest program size | time to analyze |
|---|---|---|---|---|
| [Wei80] | program | alias | 3,315 | 18s[a] |
| [Cou86] | program | points-to | unspecified | |
| [Deu92] | statement | alias | no implementation reported | |
| [LR92] | statement | alias | 6,792 | 44s |
| [CBC93, BCCH94] | statement | points-to | no implementation reported | |
| [Deu94] | statement | alias | no implementation reported | |
| [EGH94] | statement | points-to | 2,279 | no timings |
| [Ruf95] | statement | points-to | 6,771 | no timings |
| [WL95] | statement | points-to | 4,663 | 16s |
| [Ste96] | program | points-to | 75,000 | 16s |

[a])[Wei80] does not contain any empirical results. However, [LR92] has empirical results for Weihl's analyzer.

Table 1

The techniques described in the above table are further identified as follows.

[Wei80]—W. E. Weihl, *Interprocedural Data Flow Analysis in the Presence of Pointers, Procedure Variables and Label Variables*, Master's thesis, M.I.T., June 1980.

[Cou86]—D. S. Coutant, *Retargetable High-level Alias Analysis*, In Conference Record of the Thirteenth Annual ACM Symposium on Principles of Programming Languages, pages 110–118, January 1986.

[Deu92]—A. Deutsch, *A Storeless Model Of Aliasing And Its Abstractions Using Finite Representations Of Right-regular Equivalence Relations*, In Proceedings of the IEEE 1992 Conference on Computer Languages, pages 2–13, April 1992.

[LR92]—W. Landi and B. G. Ryder, *A Safe Approximation Algorithm For Interprocedural Pointer Aliasing*, In Proceedings of the SIGPLAN '92 Conference on Programming Language Design and Implementation, pages 235–248 June 1992

[CBC93]—Jong-Deok Choi, Michael Burke, and Paul Carini, *Efficient Flow-sensitive Interprocedural Computation Of Pointer-induced Aliases And Side Effects*, In Conference Record of the Twentieth Annual ACM Symposium on Principles of Programming Languages, pages 232–245, January 1993.

[BCCH94]—Michael Burke, Paul Carini, J-D. Choi, and M. Hind, *Flow-insensitive Interprocedural Alias Analysis In*

*The Presence Of Pointers*, In Proceedings of the 7th International Workshop on Languages and Compilers for Parallel Computing, pages 234–250. Springer-Verlag, August 1994.

[DEU94]—A. Deutsch, *Interprocedural May-alias Analysis For Pointers: Beyond K-limiting*. In Proceedings of the SIGPLAN '94 Conference on Programming Language Design and Implementation, pages 230–241, 1994.

[EGH94]—M. Emami, R. Ghiya, and L. J. Hendren, *Context-Sensitive Interprocedural Points-to Analysis In The Presence Of Function Pointers*, In Proceedings of the SIGPLAN '94 Conference on Programming Language Design and Implementation, pages 242–257, June 1994, Published as SIGPLAN Notices, 29(6)

[Ruf95a]—E. Ruf, *Context-insensitive Alias Analysis Reconsidered*, In Proceedings of the SIGPLAN '95 Conference on Programming Language Design and Implementation, pages 13–22, June 1995.

[WL95]—R. Wilson and M. Lam, *Efficient Context-sensitive Pointer Analysis For C Programs*, In Proceedings of the SIGPLAN '95 Conference on Programming Language Design and Implementation, pages 1–12, June 1995.

[Ste96]—B. Steensgaard, *Points-to Analysis in Almost Linear Time*, In Conference Record of the 23rd Annual ACM Symposium on Principles of Programming Languages, pages 32–41, January 1996.

The major problem with existing techniques of the prior art is that they are too costly and can not be used to analyze real programs. The summary of published empirical results in Table 1 for extant techniques indicates that no one has published results for programs larger than 7,000 lines of code. Coutant mentions analyzing programs but does not give any size or timing information. Considering that 100,000+ line programs are extremely common and programs of more than a million lines are fairly common, these techniques are not usable. Weihl and Coutant are likely to be the two most efficient techniques as they only get one alias solution for the entire program. They are not as accurate as the other techniques, but are simpler and cheaper to compute. Unfortunately both of these analyzers rely on transitive closure operations which is not efficient.

Bjarne Steensgaard has also recently developed an alias analyzer using union/find to achieve near linear performance. This is discussed in B. Steensgaard, *Points-to Analysis in Almost Linear Time*, In Conference Record of the 23rd Annual ACM Symposium on Principles of Programming Languages, pages 32–41, January 1996. It has similar time performance to that of the present invention but the relation of the two techniques in terms of quality of information produced is an open issue. Despite these similarities, the two techniques are very different in their mechanisms.

SUMMARY OF THE INVENTION

The present invention is an apparatus that provides for the safe and efficient alias analysis for programs written in programming languages which use pointers. This makes alias analysis available for a large class of computer programs on which it was previously impossible.

The source code of the program to be analyzed enters a parser which derives an abstract syntax tree representation of the syntactic structure of the source program. Next, a control flow graph (CFG) builder derives the program's control flow graph for the abstract syntax tree. Together, the parser and CFG builder could be referred to as a representation generator. The control flow graph is then used by the partition based alias analyzer to produce a safe alias solution using partitions.

The partition based alias analyzer is divided into three phases; phase one—type one alias effects, phase two—type two alias effects and phase three—function pointer effects. The control flow graph is inputted to phase one and initial partitions are derived. The initial partitions are inputted to phase two and alias partitions without function pointers effects are provided. These alias partitions are inputted to phase three and safe alias solutions using partitions are provided. These safe alias solutions using partitions are forwarded to a consumer of alias solutions.

BRIEF DESCRIPTION OF THE DRAWINGS

FIG. 1 illustrates a block diagram of one embodiment of the present invention.

FIG. 2 illustrates a functional diagram of one embodiment of the partioned based alias analyzer of the present invention.

FIG. 3 illustrates a merge operation of one embodiment of the present invention.

FIG. 4 illustrates analysis times of several programs utilizing the present invention.

DETAILED DESCRIPTION OF THE INVENTION

Computer programs provide various methods for assigning names to locations. The most common mechanism is the concept of a variable. A more complex mechanism is the combination of pointers and dynamic memory allocation. Unfortunately, it is possible that several names will exist for the same memory location. When this occurs those names are aliased to each other. Aliases fundamentally complicate the understandability of programs by both machines and humans. Thus aliases hinder any effort which requires static information about the runtime behavior of the programs.

An alias analyzer is a machine which determines the aliases of a program. Its input is a representation of the program. The representation itself is built via a representation generator which comprises a parser and a control flow graph builder. This description will concentrate on the alias analyzer itself. The parser and control flow graph builder are standard devices known in the art.

An alias analyzer is safe if it reports a superset of all the aliases that can occur during execution of the program. In other words, a safe analyzer will report all aliases, but may report some aliases that do not really exist.

A name is a variable, or a variable with a sequence of field accesses, pointer dereferences, and array accesses (e.g., p→r and *p). A fixed-location is a name that does not contain any pointer dereferences. A statically assigned fixed-location, (e.g., a declared variable name), corresponds to a unique memory location. A fixed-location for dynamically allocated memory corresponds to a subset of the heap. Names such as x, x.f, and heap variable names are fixed locations. Names such as *p and p→f are not, because determining what these object names represent requires the runtime value of some location.

The following will describe the structural and functional operation of the present invention. In order to have an efficient alias analyzer, it is important to resurrect Weihll's notion of having one program wide alias solution. W. E. Weihl, *Interprocedural Data Flow Analysis in the Presence of Pointers, Procedure Variables and Label Variables*, Master's thesis, M.I.T., June 1980. Two names are May Aliased if there exists an execution to some program point at which the names refer to the same location. The May Alias relation is symmetric and reflexive, but not transitive. It is a common but not universal practice to approximate May Alias with transitive solutions. This is described in the prior art. The present invention also adopts a transitive representation, and represents May Aliases with a partition of the set of names in the program (reflexive, symmetric, and transitive relations induce partitions). If two names are aliased, then they will be in the same partition. A partition of names can clearly be represented with space linear in the number of names.

An extremely good way to maintain reflexive, symmetric, and transitive relations (i.e., partitions) when relations can be added but not deleted, is with union/find data structures. This is further described in A. V. Aho, J. E. Hopcroft, and J. D. Ullman, *The Design and Analysis of Computer Algorithms*, Addison-Wesley, 1976. Such a relation can be maintained in time $\Theta(nG(n))$ where n is the number of union and find operations. $G(n)$ is an extremely slow growing function and is for all practical purposes a constant ($G(n) \leq 5$ for $n \leq 2^{65536}$) Union is an operation which takes two elements of the partitioned set and combines their respective partitions into one. Find takes an element of the partitioned set and returns its partition.

For simplicity of explication, it is assumed: no structure assignments (these can be broken into multiple non-structure assignments) and all functions are of type void. There are many ways to handle returned values. For example, a function assigns its return value to some global and that global is used to retrieve the returned value at the call site. When handling functions that are non-void, the returned value must be unioned with the name to which the value is assigned.

The basic idea behind the apparatus is that for the assignment a=b, *a and *b become aliased (this is called a type one alias effect) and so do $*^i$a and $*^i$b for all $i \geq 2$, assuming those names make sense (this is a type two alias effect). The apparatus of the present invention has three phases. The first phase accounts for the unions needed because of the type one alias effects of all assignments (formal/actual bindings are considered to be assignments). The second phase accounts for the unions for type two alias effects. The third phase accounts for unions needed to ensure that actuals for function pointer call sites are unioned with the formals of the called procedure. Notice, that the order of statements in the program makes absolutely no difference to this apparatus. Since it is assumed that every statement and procedure in the program can be executed, the apparatus of the present invention serendipitously safely handles setjmp/longjmp and exceptions.

In programs with recursive data structures there are potentially an infinite number of names that can have aliases. However, typically consumers of alias information are only interested in aliases of names that physically appear in the program and their fixed-location aliases. The goal of the present invention is to find the alias solution for these names. If needed, aliases involving other names can be computed from the base solution. Interesting names is defined to be the names needed to get an explicit alias solution for all fixed-locations and all names that appear in the program. If a name n appears in the program, then n, *n, and any prefix of n are interesting. Thus, if p→n appears in the program, then *p→n, p→n and the prefixes *p and p are all interesting. The reason for extending by a dereference the interesting names that appear in the program is that to compute the aliases of *p given p=q, the aliases of *q must be known. Clearly, a simple pass through the program is all that is necessary to collect all of the interesting names.

FIG. 1 illustrates a block diagram of one embodiment of the present invention. The source code of the program to be analyzed enters parser 11 which derives an abstract syntax tree representation of the syntactic structure of the source program. Next control flow graph (CFG) builder 12 derives the program's control flow graph for the abstract syntax tree. Together, parser 11 and CFG builder 12 could be referred to as representation generator 13. The control flow graph is then used by partition based alias analyzer 17 to produce a safe alias solution using partitions.

Partition based alias analyzer 17 is divided into three phases; phase one—type one alias effects 14, phase two—type two alias effects 15 and phase three—function pointer effects 16. The control flow graph is inputted to phase one 14 and initial partitions are derived. The control flow graph and the initial partitions are inputted to phase two 15 and alias partitions without function pointers effects are provided. The control flow graph and the alias partitions are inputted to phase three 16 and safe alias solutions using partitions are provided. These safe alias solutions using partitions are forwarded with the control flow graph to consumer of alias solutions 18.

The partition based alias analyzer is only one kind of analyzer. There is a broad class of analyzers that make use of alias analyzers. Definition/use analysis, modification analysis, call-graph analysis in the presence of function pointers, constant propagation analysis, and semantic checkers are some of the kinds of analyzers that make use of alias analysis to obtain results. These analyzers are incorporated into software engineering tools such as browsers, test coverage tools, debuggers, tracing tools, change assistant tools, use before definition tools and program transformation tools based on semantic checks.

A detailed specification of the functionality of the apparatus of the present invention is presented in FIG. 2 and each phase is discussed below. Phase one is self explanatory except for the meaning of plausible. A name is plausible if there is any possibility that *name can have aliases. Thus, constants are not plausible names, and assignments like i=5 and p=NULL generate no plausible lhs/rhs pairs. An assignment i=j where i and j are integers can generate the plausible pair i/j if assumptions warrant it. If you do not want to consider programs like:

int *p,i,j,k;
j=(int)&k;
i=j;
p=(int*)i;

then you can treat i and j as not plausible. Similarly, for p=q+i where p and q are pointers and i is an integer, you must consider p/q as a plausible lhs/rhs pair, but you may or may not want to consider p/i as such.

One important aspect of phase one for C is that the assignment function_pointer=function should be treated as function_pointer=&function for this analysis; *function_pointer must be unioned to function and not to *function. Finally, for this apparatus to be safe, names must be given to the heap. For example, p=malloc(sizeof(char)) should union *p to some fixed location (e.g., heap or $heap_{program-point}$).

Phase two simply makes sure that for all $name_i$ and $name_j$ in a partition, that $*name_i$ is in the same partition as $*name_j$ (e.g. type two alias effects). Phase two uses map to remember, for each partition and operation (e.g., a dereference or access of field f), the partition that results from applying that operation to names in the partition. In other words, map is constructed so that for all n, map[find(n)] [*]=find(*n) assuming *n is interesting. The type signature of map is map: partition→(operation→partition ). Map is built incrementally by iterating through all interesting names.

The merge operation is formally specified in FIG. 3. It basically unions two partitions and updates map. Map can be implemented in any of a number of ways. Constant time initialization arrays would guarantee linear worst case time behavior; however, the worst case number of non-NULL entries in map[part], represented by $n_e$, is likely to be small as its worst case is approximately the maximum number of fields in a structure (at least without casting). It is conjectured that associating a linked list with each partition will be acceptable in practice. The cost of phase two is dominated by the worst case linear number of calls of merge. Ignoring recursion, each call of merge costs $\phi(n_e)$ union/finds which we consider a constant number. Since there can only be a linear number of recursive invocations of merge (each recursive call reduces the number of partitions by one), this makes the worst case cost of phase two a linear number of union/finds.

Phase three is straightforward. fp can be an arbitrary name; for example, var, *var, or **var. Care must be taken in C because the calls var(. . .) and (*var)() are semantically equivalent. In Phase three, the former should be treated as the latter. Traditional union/find representations are not good at iterating the elements of a partition. However, a linked list (with first and last pointers) of the elements can be associated with each partition, adding a constant cost per union operation. Such a list can be used to make the "for each function func in the partition of fp" efficient. It also is possible to optimize phase three by associating a time stamp of when the last union was performed on each partition. Phase three is not worst case linear, but it is no worse than the cost of a quadratic number of finds (from the merge), and as written, it can be this costly. In practice, the cost of phase three should be less than the cost of a linear number of union/finds.

A prototype of the alias analyzer of the present invention has been constructed and the efficiency of the analyzer is defined by the small amount of time that the analyzer spent finding the alias solution for several programs. These results are indicated in FIG. 4. Notice that these programs are considerably larger than any of the programs analyzed by the techniques of the prior art shown in Table one. The programs in FIG. 4 still are not large. The analyzer of the present invention has efficiently analyzed every program presented to it, but the program representation generator that the analyzer relies on can not handle large programs.

The important aspects of the present invention are; the use of union/find data structures to represent the alias solution, the restriction of explicitly finding aliases only for names that are physically in the program, and the accounting for function pointer resolution as a separate phase of the analyzer. These features allow the apparatus of the present invention to safely and efficiently determine aliases for programs written in programming languages which use pointers. This makes alias analysis available for a large class of computer programs for which it was previously impossible. The present invention performs its analysis faster while using less memory resources than any known technique except for the recently published technique in [Ste96] which obtains its results through a different mechanism.

It is not intended that this invention be limited to the hardware or software arrangement, or operational procedures shown disclosed. This invention includes all of the alterations and variations thereto as encompassed within the scope of the claims as follows.

We claim:

1. A system for providing a partition based alias analysis comprising:

representation generator means for receiving a source program; and, partitioned based alias analyzer means connected to said representation generator means for providing safe alias solutions using partitions; wherein order of statements in said source program does not affect said partition based alias analysis.

2. A system for providing a partition based alias analysis as claimed in claim 1 wherein union/find data structures are used to represent alias solutions.

3. A system for providing a partition based alias analysis comprising:

representation generator means for receiving a source program; and, partitioned based alias analyzer means connected to said representation generator means for providing safe alias solutions using partitions; wherein there is a restriction of explicitly finding aliases only for names that are physically in said source program.

4. A system for providing a partition based alias analysis as claimed in claim 1 wherein accounting for function pointer resolution is a separate phase of said partitioned based alias analyzer means.

5. A system for providing a partition based alias analysis as claimed in claim 1 wherein said representation generator means comprises:

parser means for receiving a source program to be analyzed and for providing an abstract syntax tree; and, control flow graph builder means connected to said parser means for receiving said abstract syntax tree and for providing a control flow graph.

6. A system for providing a partition based alias analysis as claimed in claim 1 wherein said partition based alias analyzer means comprises:

phase one—type one alias effects;

phase two—type two alias effects; and, phase three—function pointer effects.

7. A system for providing a partition based alias analysis as claimed in claim 6 wherein said phase one—type one alias effects accounts for unions needed because of type one alias effects of all assignments.

8. A system for providing a partition based alias analysis as claimed in claim 6 wherein said phase two—type two alias effects accounts for unions needed because of type two alias effects of all assignments.

9. A system for providing a partition based alias analysis as claimed in claim 6 wherein said phase three—function pointer effects accounts for unions needed to ensure that actuals for function pointer call sites are unioned with formals of called procedure.

10. A system for providing a partition based alias analysis as claimed in claim 1 wherein said partitioned based alias analyzer means comprises:

phase one—type one alias effects for receiving said control flow graph and for providing initial partitions;

phase two—type two alias effects for receiving said control flow graph and said initial partitions and for providing alias partitions without function pointers effects; and, phase three—function pointer effects for receiving said control flow graph and said alias partitions without function pointers effects and for providing safe alias solutions using partitions.

11. A system for providing a partition based alias analysis comprising:

parser means for receiving a source program to be analyzed and for providing an abstract syntax tree;

control flow graph builder means connected to said parser means for receiving said abstract syntax tree and for providing a control flow graph;

phase one—type one alias effects for receiving said control flow graph and for providing initial partitions;

phase two—type two alias effects for receiving said control flow graph and said initial partitions and for providing alias partitions without function pointers effects; and, phase three—function pointer effects for receiving said control flow graph and said alias partitions without function pointers effects and for providing safe alias solutions using partitions.

12. A method of performing partition based alias analysis comprising the steps of:

obtaining a control flow graph from a source program; and, obtaining safe alias solutions using partitions from said control flow graph; wherein order of statements in said source program does not affect said partition based alias analysis.

13. A method of performing partition based alias analysis comprising the steps of:

obtaining a control flow graph from a source program; and, obtaining safe alias solutions using partitions from said control flow graph; wherein obtaining a control flow graph comprises the steps of:

utilizing a parser to obtain an abstract syntax tree of said source program; and, utilizing a control flow graph builder on said abstract syntax tree to obtain said control flow graph.

14. A method of performing partition based alias analysis as claimed in claim 12 wherein obtaining safe alias solutions using partitions comprises the steps of:

utilizing type one alias effects for providing initial partitions;

utilizing type two alias effects for providing alias partitions without function pointers effects; and, utilizing function pointer effects for providing safe alias solutions using partitions.

15. A method of performing partition based alias analysis comprising the steps of:

obtaining a control flow graph from a source program; and, obtaining safe alias solutions using partitions from said control flow graph; wherein obtaining safe alias solutions using partitions comprises the steps of:

utilizing union/find data structures to represent alias solutions;

explicitly finding aliases only for names that are physically in said source program; and, accounting for function pointer resolution in a separate phase.

16. A partition based alias analyzer comprising:

phase one—type one alias effects for receiving a control flow graph and for providing initial partitions;

phase two—type two alias effects for receiving said control flow graph and said initial partitions and for providing alias partitions without function pointers effects; and, phase three—function pointer effects for receiving said control flow graph and said alias partitions without function pointers effects and for providing safe alias solutions using partitions; wherein:

union/find data structures are used to represent alias solutions;

there is a restriction of explicitly finding aliases only for names that are physically in a source program; and, accounting for function pointer resolution is a separate phase of said partitioned based alias analyzer.

* * * * *